Feb. 21, 1961

G. E. KINDIG 2,972,291

AXIAL LENS GUIDING SYSTEM

Filed Feb. 13, 1959

Guilford E. Kindig
INVENTOR.

BY R. Frank Smith
ATTORNEYS

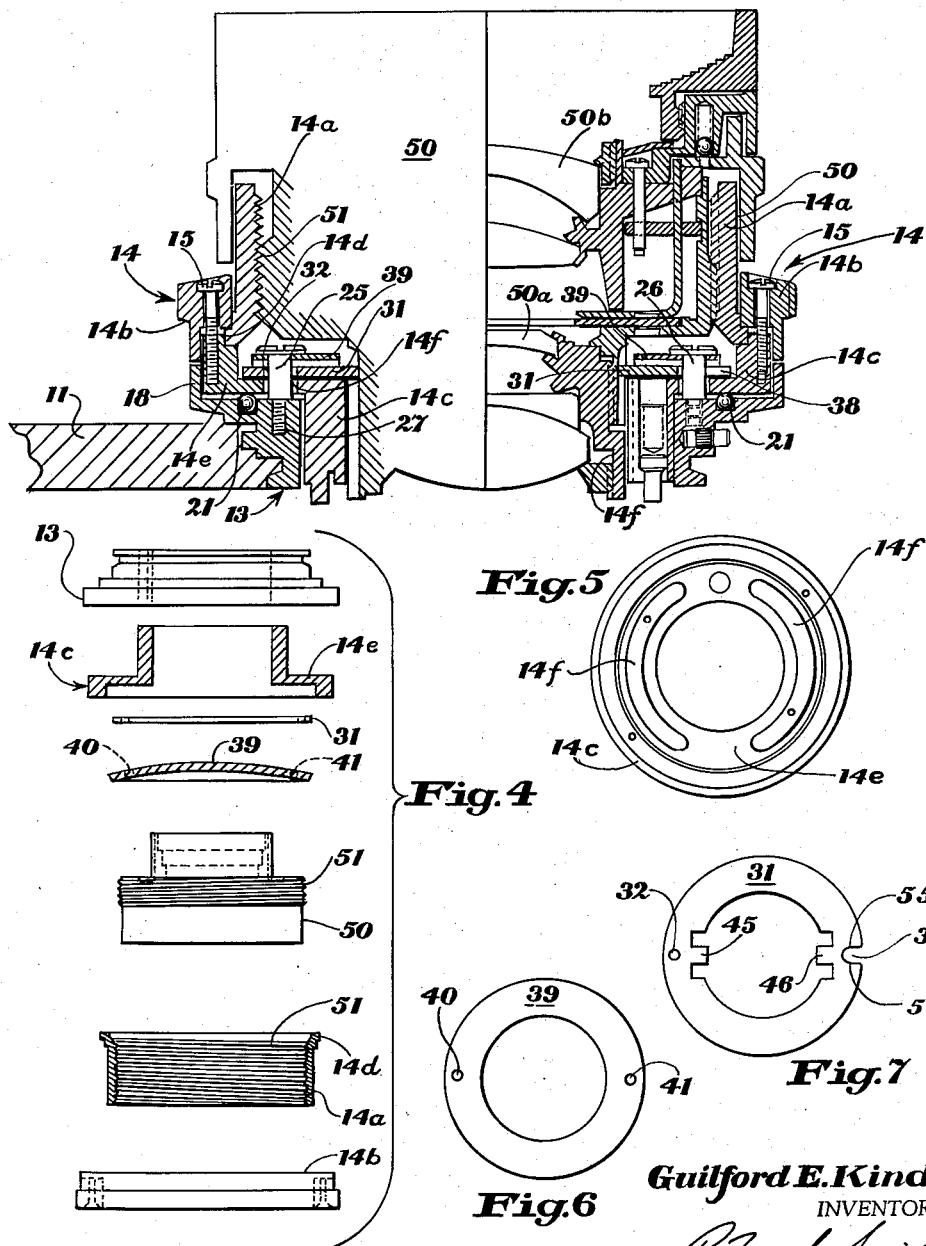

United States Patent Office 2,972,291
Patented Feb. 21, 1961

2,972,291
AXIAL LENS GUIDING SYSTEM

Guilford E. Kindig, Rochester, N.Y., assignor to Eastman Kodak Company, Rochester, N.Y., a corporation of New Jersey Filed Feb. 13, 1959, Ser. No. 793,176

7 Claims. (Cl. 95—45)

The present invention relates to lens mounts, and more particularly to a self-aligning system in which a smooth, sliding or guiding fit between the parts can be readily obtained. Such a system is highly desirable in lens mounts to insure proper relative movement between the parts to focus the lens elements accurately.

In certain types of lens mounts, a focusing ring is rotatable but non-axially movable on the base or fixed part of the mount which is attached to the camera body or other suitable fixed support. A tubular lens barrel is positioned within the focusing ring, and is connected to the latter through complementary threads on the ring and barrel. In order to focus the lens system, carried by the lens barrel, the latter must be translated axially relative to the focusing ring. It is desirable, for reasons of appearance and locating of dials, to eliminate rotation of the lens barrel. To secure this desirable relation, the lens barrel is suitably keyed by a rockable guide ring so that rotation of the focusing ring introduces substantially only translation or axial movement to the lens barrel. Also, smooth axial guiding of the barrel in the focusing ring is secured in the present invention, by a balanced couple which opposes rotation of the barrel as it is translated and which prevents binding in the thread section, as will be later pointed out.

These results are accomplished by pivotally mounting a guide ring for rocking movement about a fixed axis which is spaced radially of the barrel and parallel to the axis thereof. In the preferred embodiment, the guide ring is formed with a pair of diametrically-arranged inwardly-extending keys, guides or lugs which are in radial alignment with said pivot, and which project into a pair of radially-aligned inwardly-extending open-end slots formed on the outer surface of the barrel. This lug-and-slot arrangement serves to limit the barrel to axial movement upon rotation of the focusing ring. Also, this lug-and-slot arrangement affords a balanced couple between the focusing ring and the barrel to prevent binding of the threads which may result from the center line of the slots being eccentric to the center line of the threads; or non-parallelism of the slot sides, or the axis of the threads being non-parallel to the slots. Also, this arrangement eliminates the necessity of a delicate adjustment of the guides, and insures a smooth, free, axial translation of the lens barrel during the focusing operation.

The principal object of the present invention is the provision of a new and improved self-aligning arrangement for the movable parts of a lens mount.

A further object of the invention is the provision of a new and novel arrangement to constrain the lens barrel against rotative movement.

Still another object of the invention is the provision of a balanced couple to provide a smooth sliding fit to allow proper movement of the mount parts.

Yet another object of the invention is the provision of a self-aligning system which is simple in structure, rugged, accurate, and highly effective in use.

To these and other ends, the invention resides in certain improvements and combinations of parts, all as will be hereinafter more fully described, the novel features being pointed out in the claims at the end of the specification.

In the drawings:

Fig. 3 is a horizontal or axial sectional view through the lens mount of the present invention. On the right side the mount shows the complete mount parts, while the left side shows only the parts relating to the present invention;

Fig. 4 is an exploded view of the parts relating to the present invention;

Fig. 5 is a front view of the base part of the mount, and a member of the multi-piece focusing ring, showing the slots which limit the rotation of the focusing ring;

Fig. 6 is an elevation view of a spring disc used with the guide ring of the present invention, and Fig. 7 is an elevation view of the guide ring, showing the relation of the control lugs, and the eccentric pivot.

Similar parts in the various views are indicated by the same numerals.

Figure 1:
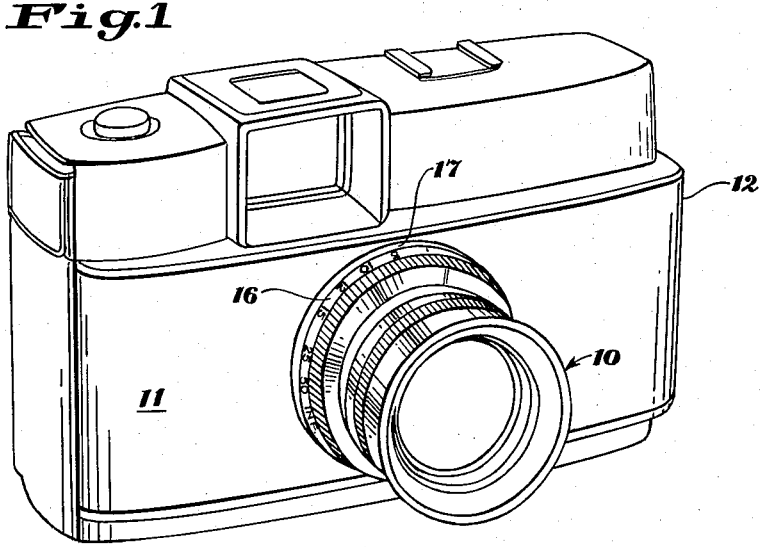
Fig. 1 is a front, perspective view of a roll film camera, showing the relation thereto of a lens mount constructed in accordance with the present invention.

The lens mount, broadly designated by the numeral 10, is mounted on the front wall 11 of a camera 12. The particular camera 12 is for illustrative purposes only, and is not intended as a limitation, as the lens mount 10 of the present invention can be used with a wide variety of camera designs. The mount 10 has a tubular base portion 13 which is suitably screwed or otherwise attached, to the front wall 11 of the camera 12. The manner of attaching the mount 10 to the camera 12 forms no part of the present invention and further details are not shown. Suffice it to say, base 13 is mounted in fixed relation on the wall 11, as shown in Fig. 3.

The focusing ring, broadly designated by the numeral 14, is rotatably mounted but axially fixed on the base 13 so the ring 14 may rotate freely but is constrained against axial movement. The ring 14 may be made in one piece, but for manufacturing and assembly reasons, it is preferred to make the ring 14 in three separate tubular parts 14a, 14b and 14c, as shown in Fig. 3. The parts 14a, 14b and 14c are held in assembled relation by diametrically arranged headed screws 15, the upper portions of which extend through part 14b and the lower ends are threaded into registering threaded openings in the part 14c, as shown in Fig. 3. A rim 14d on the lower end of part 14a is pinched between 14b and 14c by screws 15, as illustrated in Fig. 3, so the parts 14a, 14b and 14c act as a unit. By means of this arrangement, screws 15 may be backed off to permit rotation of 14a relative to 14b and 14c, having previously aligned scale 16 on 14b relative to a fixed index 17 carried by part 13. Rotation of 14a, while restraining tubular lens barrel 50 by action of key 31, against rotation, imparts axial movement of said barrel until proper position of lens is achieved relative to film (which lies perpendicular to axis of barrel 10).

Part 14c is Z-shaped in longitudinal section, see Fig. 3, and has a horizontal section 14e which rests on ball bearings 21 carried by, and spaced transversely around, the part 13. The horizontal section 14e has a pair of arcuate slots 14f, as best shown in Fig. 5, through which a pair of diametrically arranged screws 25 and 26 extend. The lower end 27 of each screw 25 and 26 engages in a registering threaded opening in base 13 to hold the screws 25 and 26 in fixed relation, as clearly illustrated in Fig. 3. The length of the arcuate slots 14f serve to limit the adjusting movement of the focusing ring 14 as is deemed apparent. By means of this arrangement, rotation of the focusing ring is limited to a movement of about 110° by the opposite ends of the slots 14f. Thus, when screws 15 are tightened down parts 14a, 14b and 14c, which comprise the focusing ring 14, rotate as a unit, being rotatably supported on ball bearings 21 and held against axial movement by the fixed screws 25 and 26, as will be later described.

A guide ring 31, of the shape shown in Fig. 7, overlies the horizontal section 14e of part 14c, see Fig. 3. The screw 25 extends through a registering opening 32 of guide ring 31 to mount the latter for rocking movement on base 13 about the screw 25 and in a direction radially of said mount 10. Thus, ring 31 is mounted eccentrically for rocking movement in its own plane about the axis of screw 25 which is spaced radially outward from and parallel to the optical axis of the mount 10, for a purpose to be later described. On the other hand, screw 26 passes freely through a slot 38 which is diametrically opposite opening 32 of ring 31, as best shown in Fig. 7. A flat or dish-shaped spring 39 is positioned under the head of screws 25 and 26 to hold the latter yieldably in position. Holes 40 and 41 are positioned in disc 39 through which screws 25 and 26 freely pass, see Fig. 6. The guide ring 31 is also formed with a pair of diametrically-arranged, inwardly-extending keys or lugs 45 and 46, which are in radial alignment with screws 25 and 26, and extend into a pair of registering diametrically-arranged, slots 47 and 48 on the lens barrel 50, the arrangement of these parts being best shown in Fig. 2. The lens barrel 50 and the focusing ring 14 are formed with cooperating threaded parts 51 to connect the barrel 50 and ring 14 for relative movement. The barrel 50 carries a rear lens cell 50a and a front lens cell 50b which move axially as a unit with barrel 50.

When the focusing ring 14 is rotated, the friction in the thread connection 51 may tend to cause the lens barrel 50 to follow. However, in order to focus the lens system, carried by the lens barrel 50, the latter must be translated axially, but without rotation, as is deemed apparent. To secure this result, the barrel 50 is keyed to ring 31 by the cooperating lugs 45 and 46 and slots 47 and 48, as best shown in Fig. 2.

Figure 2:
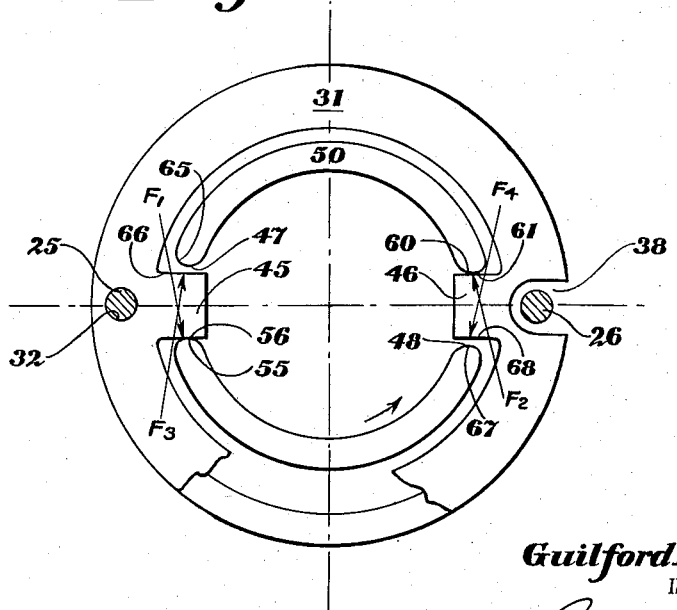
Fig. 2 is a rear view of the lens mount with unrelated parts removed, showing the relation of the control lugs and slots of the present invention.

Turning now to Figs. 2 and 3, when the focusing ring 14 is rotated, friction in the thread connection 51 may tend to cause the lens barrel 50 to rotate with ring 14. For example, if ring 14 is rotated clockwise, Fig. 2, the lens barrel 50 may tend to follow, as above mentioned. Such clockwise rotation of the lens barrel 50 will bring edge 55 of slot 47 into engagement with the lower edge 56 of the lug 45, see Fig. 2. This engagement will serve to impart a counterclockwise planar rocking of the ring 31 about pivot 25. It is apparent that further counterclockwise rotation of ring 14 may introduce further rotation of barrel 50. However, as above mentioned, the barrel 50 should be held against rotation. Thus, means should be provided to limit the rotation of the barrel so that upon rotation of ring 14 the barrel will be moved axially only. The edges of slot 38 could be used to cooperate with screw 26 for this purpose. However, for reasons to be later described, it is preferred to utilize lug 46 and slot 48 to limit rotation of the barrel 50.

Therefore, as the counterclockwise rotation of the ring 31 is continued, edge 60 of slot 48 engages upper edge 61 of lug 46 to arrest further rocking of the ring 31 to hold the lens barrel against further rotation. Then, further rotation of ring 14 will serve to impart only axial translation or non-rotating movement to barrel 50 to move the latter axially of the mount to focus the lens system. As is apparent from Fig. 2, the slots 47 and 48 are slightly wider than the lugs 45 and 46 to allow for tolerances. Because of the ratio of the distances of slots 47 and 48 from pivot 25 of ring 31, and the clearance of lug 46, the slot 48 is reduced at a magnified rate. If, however, the focusing ring 14 is rotated in a counter clockwise direction, the edge 65 of slot 47 will engage the edge 66 of lug 45 to rock the ring 31 clockwise about pivot 25 until the edge 67 of slot 48 engages edge 68 of lug 46 to hold the lens barrel 50 against further rotative movement.

Thus, it is apparent that the initial rotation of the focusing ring 14 may, due to friction of the thread connection 51 between the focusing ring 14 and the lens barrel 50, impart a slight rotation to the lens barrel 50. This slight rotation of barrel 50 will serve to rock ring 31, in its own plane about pivot 25, until the lugs and slots engage to arrest further rotation of the barrel 50. Then, any additional rotation of the focusing ring 14 will impart only a translation or axial movement to the lens barrel 50. Thus, the lens barrel 50 may, for all practical purposes, be considered as limited to axial movement only upon rotation of the ring 14. On the other hand, focusing ring 14 is limited in its rotative movement by reason of slots 14f, and is held against axial movement by screws 25 and 26.

The above-described structure provides a guide ring 31, rockable in its own plane, about a fixed pivot 25, spaced radially from but parallel to the optical axis of the mount. Any tendency of barrel 50 to rotate upon rotation of ring 14 will cause barrel 50 to rock ring 31 in its own plane until the position is reached in which cooperating keys or parts on ring 31 and barrel 50 arrest further rotation of the latter so that any further rotation of the focusing ring 14 will introduce only translation or axial movement to the barrel 50. Also, the engagement of the keys and lugs 45 and 46 on the edges of slots 47 and 48 provide a balanced couple of forces. For example, clockwise rotation of barrel 50 will introduce the balanced couple, $F_1=F_2$, or a counterclockwise rotation of the barrel will provide balanced couple $F_3=F_4$, see Fig. 2.

By reason of these balanced couples, rotation of the focusing ring 14, in either direction, will introduce only translation to the barrel 50. Contact of both keys and lugs 45 and 46 with edges 47 and 48, respectively, completes the restraining couple to prevent binding of the thread connection 51 to provide the desired smooth axial movement and eliminate the delicate adjustment of the lugs 45 and 46 as the clearance between lug 46 and slot 48 must be only sufficient to allow for tolerance of slots 47 and 48.

The present invention thus provides a self-aligning system in which the lens barrel is held against rotative movement, but is enabled to move axially, smoothly, and without binding.

While one embodiment of the invention has been disclosed, it is to be understood that the inventive idea may be carried out in a number of ways. Therefore, this application is not to be limited to the precise details described, but is intended to cover all variations and modifications thereof which fall within the scope of the appended claims.

What I claim and desire to secure by Letters Patent of the United States is:

1. In a lens mount, the combination with a base portion, a focusing ring mounted on said base for rotation only, a lens barrel positioned within said ring, a threaded connection between said barrel and said ring, of a guide ring surrounding said barrel, means for pivotally mounting said guide ring on said base eccentrically of said lens mount axis for rocking movement relative to said barrel and transversely thereof, and cooperating means on said guide ring and said barrel adapted to positively engage one another and limit said barrel to axial translation upon rotation of said focusing ring.

2. In a lens mount, the combination with a base portion, a focusing ring mounted on said base for rotation only, a lens barrel positioned within said ring, a threaded connection between said barrel and said ring, of a guide ring surrounding said barrel, means for pivotally mounting said guide ring on said base eccentrically of said lens mount axis for rocking movement in its own plane radially of said barrel, cooperating means of said guide ring and said barrel adapted to rock said guide ring upon any rotatable movement imparted to said barrel by rotation of said focusing ring, and stop means engaging said guide ring to limit the rocking movement thereof to constrain said barrel substantially to axial movement relative to said focusing ring upon rotation of the latter.

3. In a lens mount, the combination with a base portion, a focusing ring mounted on said base for rotation only, a lens barrel positioned within said ring, a threaded connection between said barrel and said ring, of a guide ring surrounding said barrel, means for pivotally mounting said guide ring on said base eccentrically of said lens mount axis for rocking movement in its own plane radially of said barrel, cooperating means on said guide ring and said barrel to rock said guide ring upon any rotatable movement imparted to said barrel by rotation of said focusing ring, and cooperating means on said guide ring and said barrel to limit rotation of said barrel to constrain the latter substantially to axial movement only by rotation of said focusing ring.

4. In a lens mount, the combination with a base portion, a focusing ring mounted on said base for rotation only, a lens barrel positioned within said ring, a threaded connection between said barrel and said ring whereby rotation of one tends to rotate the other, of a guide ring surrounding said barrel, means for pivotally mounting said guide ring on said base eccentrically of said barrel for rocking movement in its own plane and radially of said barrel, and cooperating key and slot means on said guide ring and said barrel to constrain the latter to free axial movement upon rotation of said focusing ring.

5. A self-aligning lens system comprising, a base, an annular focusing ring mounted for rotation only on said base, a lens barrel positioned within said ring, means connecting said ring to said barrel, whereby rotation of one tends to rotate the other, a guide ring rockably mounted on said base adjacent said barrel, and a connection between said barrel and said guide ring adapted to provide a balanced couple of forces acting on said barrel to prevent rotation of said barrel and permit only a free axial movement thereof upon rotation of said focusing ring.

6. A self-aligning lens system comprising, a base, an annular focusing ring mounted for rotation only on said base, a lens barrel positioned within said ring, a threaded connection between said focusing ring and said barrel whereby rotation of one tends to rotate the other, a guide ring pivotally mounted on said base adjacent but eccentric to said barrel, and a key connection between said barrel and said guide ring whereby rotation of said barrel will pivot said guide ring, said key connection arranged to provide a balanced couple of forces acting on said lens barrel to prevent rotation of said barrel and afford smooth axial guiding of said barrel in said focusing ring.

7. A self-aligning lens system comprising, a base, an annular focusing ring rotatably mounted on said base, a lens barrel positioned in said ring, a threaded connection between said focusing ring and said barrel whereby rotation of one tends to rotate the other, of a flat guide ring surrounding said barrel, means to connect said guide ring on said base for rocking in its plane about a pivot spaced radially from and eccentric to said barrel, said barrel being provided with a pair of diametrically arranged longitudinal slots, a pair of inwardly extending lugs on said guide ring positioned in said slots, said lugs and slots being in radial alignment with said pivot and when brought into engagement upon rotation of said ring providing a balanced couple of forces which opposes the rotation of said barrel by said focusing ring so that the latter will impart only axial movement to said barrel, said balanced couple in opposing the rotation of the barrel affording smooth guiding of the barrel as the latter moves axially.

References Cited in the file of this patent
UNITED STATES PATENTS

| | | |
|---|---|---|
| 2,172,340 | Mihalyi | Sept. 5, 1939 |
| 2,256,373 | Crumrine | Sept. 16, 1941 |
| 2,887,937 | Gebele | May 26, 1959 |